United States Patent
Fine et al.

[15] 3,699,164
[45] Oct. 17, 1972

[54] CATALYTIC HYDRATION OF NITRILES

[72] Inventors: Leonard Wolfe Fine; Ken Matsuda, both of Stamford; James Mitchell Photis, Ridgefield, all of Conn.

[73] Assignee: American Cyanamid Company, Stamford, Conn.

[22] Filed: March 13, 1970

[21] Appl. No.: 19,468

[52] U.S. Cl..........260/561 N, 260/558 R, 260/561 R
[51] Int. Cl.............................................C07c 103/08
[58] Field of Search......................260/561 N, 561 R

[56] References Cited
UNITED STATES PATENTS

3,366,639   1/1968   Haefele..................260/561 X
3,329,715   7/1967   Strohmeyer et al. ......260/561

*Primary Examiner*—Lewis Gotts
*Assistant Examiner*—Ethel G. Love
*Attorney*—Gordon L. Hart

[57] ABSTRACT

A catalytic process for hydration of a nitrile, e.g. acrylonitrile, with water in presence of a manganese dioxide catalyst is operated to obtain improved conversion and longer catalyst life by carrying out the reaction in dilute aqueous solution of a strong acid, e.g. in aqueous solution of $HNO_3$ or HCl at pH below 3.0. The product is the amide, e.g. acrylamide.

6 Claims, No Drawings

CATALYTIC HYDRATION OF NITRILES

The invention relates to catalytic hydration of nitriles with water.

U.S. Pat. No. 3,366,639 patented Jan. 30, 1968 describes catalytic hydration of nitriles with water in the presence of manganese dioxide catalyst.

An object of the present invention is to provide improvements in the catalytic hydration of nitrile with water using manganese dioxide catalyst.

In accordance with the invention, nitriles are hydrated with water in the presence of manganese dioxide catalyst using a dilute aqueous solution of a strong acid, preferably sufficient to lower pH of the reaction medium to 3.0 or below. At acid pH values the percent conversion of acrylonitrile to acrylamide is increased and the catalyst retains its activity for a much longer time.

By the term "strong acid" is meant an acid that is completely dissociated in dilute aqueous solution. Suitable strong acids include inorganic and organic acids such as hydrochloric, nitric, trifluoroacetic, perchloric, benzene sulfonic, and p-toluene sulfonic acids and the like.

EXAMPLE 1

Place 1 gm. $MnO_2$ in a small test tube, then add 5 gms. water which has been adjusted to pH 1.0 by addition of nitric acid. Dissolve 0.3 gm. acrylonitrile in the acid solution, seal the tube and react for one hour in a constant temperature bath at 57° C. with constant agitation by rocking. At the end of one hour, analysis of a sample from the tube shows 26.7 percent conversion of the nitrile to acrylamide. A control reaction is run exactly the same, except without addition of acid, at autogenous pH about 6.8. Analysis of the control at the end of one hour shows only 12.4 percent conversion of the nitrile to acrylamide.

The acid reaction medium improves catalyst life so that high conversion and selectivity are maintained over a much longer period, as demonstrated by the following example.

EXAMPLE 2

Prepare and react test and control samples as described in Example 1, except using water adjusted to pH 1.0 with hydrochloric acid for the test sample. At the end of the first hour remove the reactor tubes, centrifuge the contents, decant and wash twice with water of the same pH to be used for the next reaction, leaving only the washed original catalyst in each tube. Then recharge the tubes with acrylonitrile, acid and water in the same proportions as before and react for another hour. At the end of that hour repeat the same separation and recharging steps, then react for another hour. Percent conversion to acrylamide in the pH 1 acid solutions were, respectively, 17.8 percent, 21.6 percent and 25.4 percent for the three successive runs. The control runs at about pH 7 yielded percent conversions of 12.9 percent, 11.8 percent and 9.1 percent respectively. These results demonstrate the better sustained catalyst activity as well as improved conversion obtained in the acid medium. The catalyst activity (hence the percent conversion) in acid medium is improved as catalyst use time is extended. After several additional one-hour runs in acid medium the activity will level off at a good conversion and will not decrease substantially with continued use in acid medium.

To obtain the highest yield in the earlier reactions one may pretreat the manganese dioxide catalyst with acid to improve yields on the initial runs.

EXAMPLE 3

To 75 ml of 1 percent $HNO_3$ aqueous solution add 15 gm. manganese dioxide. Stir for 45 minutes then filter, wash with 300 ml deionized water and dry at 110° C. for 6 hours. This pretreated catalyst improves initial yields of both the test and control samples in a test conducted as in Example 2.

Percent Conversion Using Pretreated Catalyst

| Acid Solute | None | HCl | HCl |
|---|---|---|---|
| pH | About 7.0 | 1.0 | 1.0 |
| Catalyst | pretreated | pretreated | untreated |
| run 1 | 30.1 | 24.0 | 9.2 |
| 2 | 18.6 | 21.2 | 23.6 |
| 3 | 11.3 | 22.4 | 25.2 |
| 4 | 6.7 | 20.2 | 32.2 |
| 5 | 6.1 | 18.6 | 32.5 |
| 6 | | 23.0 | |

The improved catalyst activity obtained by acid pretreatment remains high through continued successive runs in acid reaction solutions, but in the control runs without the acid reaction medium, activity of the pretreated catalyst rapidly falls off with each successive one-hour run. A control is also shown with an untreated catalyst in acid solution.

In all of the foregoing examples the reported results are obtained using gamma or delta forms of manganese dioxide which are the preferred kinds of manganese dioxide catalyst. Example 1 used the General Metallic Oxides Chemical Ore No. 39 manganese dioxide listed below. Example 2 used the Synthox manganese dioxide listed below. Example 3 used the SEDEMA manganese dioxide listed below. The improvement of the invention, however, is also obtained with several other types of manganese dioxide of varying catalyst activity as indicated in the list below. Other manganese dioxides not listed will be found to be suitable for catalyst.

Catalytic Manganese Dioxides

| | |
|---|---|
| Synthox | A gamma form obtained from Piles Wonder Company, France |
| Winthrop | Delta form obtained from Winthrop Chemical Company, U.S.A. |
| SEDEMA | Gamma form obtained from SEDEMAS Mechema, Belgium |
| BDH | Delta form obtained from British Drug House, London |
| American Potash Electrolytic | Obtained from American Potash Corporation, U.S.A. |
| Lavinore "A" | Obtained from Lavino & Company, U.S.A. |
| Chemical Ore No. 39 | Hydrated delta form obtained from General Metallic Oxides Company, U.S.A. |

Sustained catalyst activity and improved conversion are obtained in a process of the invention, preferably with aqueous solutions having pH below about pH 3.0. The optimum pH value for highest yield and sustained catalyst activity is about pH 1.0, although the optimum pH value may vary depending on the selected catalyst and reaction conditions. With some kinds of manganese dioxide catalyst it may be preferable to operate at pH value higher than the optimum value to reduce loss of catalyst by dissolution in the acid solution; such loss to solution may become severe at the lower pH values.

The hydration process is most economically carried out at ambient pressures, but the invention can be applied to processes using pressures above or below atmospheric. Preferred reaction temperatures are in the range from about 20° to 100° C. but the invention can be applied to processes operated at higher or lower temperatures. The invention can be carried out in heterogeneous mixtures in cases where the selected nitrile is not entirely soluble in the aqueous acid solution.

The improved yield and extended catalyst life obtained by a process according to the invention are also obtained in the catalytic hydration of nitriles other than acrylonitrile. For example, these improvements can be demonstrated using acetonitrile, benzonitrile and other nitriles such as those mentioned in the aforementioned U.S. Pat. No. 3,366,639, in a process according to the present invention.

The concentration in the reactor of the catalyst with respect to the reactants has not been found to be critical to the present invention. Generally a higher production of catalyst produces a higher rate of reaction.

The concentration in the reactor of nitrile with respect to water is not critical; generally better yields are obtained with a generous excess of water above the stoichiometric amount, and with enough water to dissolve the nitrile. In the hydration of acrylonitrile we prefer to operate at or above the saturation concentration of acrylonitrile in aqueous solution. The acrylamide product is readily soluble in the aqueous reaction medium.

At pH values much below 0.8 the loss of nitrile to side reactions may become undesirable, although the conversion and catalyst life are not seriously impaired. In the pH range from about pH 0.8 to about pH 8.0 the selectivity of conversion of acrylonitrile to acrylamide is near 100 percent.

We claim:

1. In a process comprising hydration of a nitrile with water in the presence of manganese dioxide catalyst to produce an amide, the improvement wherein said hydration is carried out in presence of manganese dioxide catalyst with said nitrile in a dilute aqueous solution of a strong acid, said aqueous solution having pH less than 3.0.

2. A process comprising pretreating catalytic manganese dioxide with aqueous solution of a strong acid and using such pretreated catalytic manganese dioxide as the catalyst in a process defined by claim 1.

3. A process defined by claim 1 wherein said manganese dioxide catalyst is delta form manganese dioxide.

4. A process defined by claim 1 wherein said manganese dioxide catalyst is gamma form manganese dioxide.

5. A process defined by claim 1 wherein said nitrile is acrylonitrile.

6. A process defined by claim 1 wherein pH of said aqueous solution is about 1.0.

* * * * *